UNITED STATES PATENT OFFICE.

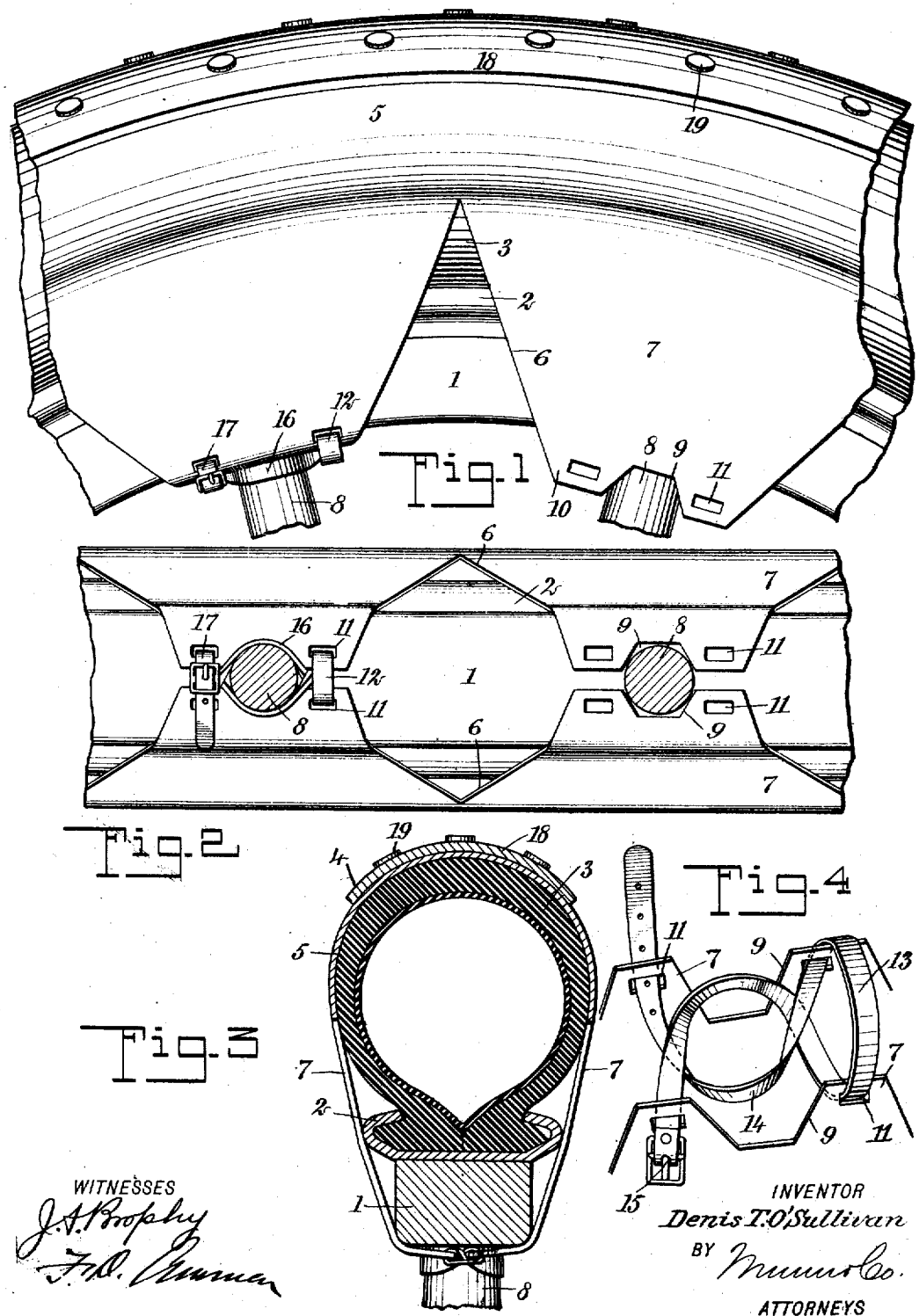

DENIS T. O'SULLIVAN, OF WEST ORANGE, NEW JERSEY.

TIRE-TREAD.

954,333.  Specification of Letters Patent.  Patented Apr. 5, 1910.

Application filed September 12, 1908. Serial No. 452,694.

*To all whom it may concern:*

Be it known that I, DENIS T. O'SULLIVAN, a citizen of the United States, and a resident of West Orange, in the county of Essex and State of New Jersey, have invented a new and Improved Tire-Tread, of which the following is a full, clear, and exact description.

This invention relates to tire treads such as are attached to the pneumatic tires of automobiles or similar vehicles for the purpose of protecting the same, and to present a rough surface which will engage the roadway to prevent skidding.

An object of the invention is to provide a tire tread having an improved form which facilitates its attachment to the wheel, without producing a puckering of the material at the sides of the tread.

A further object of the invention is to provide improved means for securing the tread to the spokes of the wheel, which will prevent side slipping and longitudinal slipping of the tread on the tire.

The invention consists in the construction and combination of parts to be more fully described hereinafter and particularly set forth in the claim.

Reference is to be had to the accompanying drawings forming a part of this specification, in which similar characters of reference indicate corresponding parts in all the figures.

Figure 1 is a side elevation showing a short portion of the rim of a wheel and illustrating the manner in which the tread is constructed and attached to the wheel; Fig. 2 is substantially a bottom plan of the parts shown in Fig. 1 and further illustrating the construction; Fig. 3 is a cross section taken through the rim of a wheel, through the tire, and through the tread; and Fig. 4 is a perspective illustrating the details of the construction of the tread at the point where it is attached to the spokes.

Referring more particularly to the parts, 1 represents the felly of the wheel, the same being provided with a metal rim 2 which carries the pneumatic tire 3, as shown. The tread 4 comprises a sheath 5 of leather or similar material, which is preferably formed in a continuous piece or band encircling the tire and wheel. The sheath forms a complete covering for the outer part of the tire, and the inner portion of the sheath is cut away so as to form deep V-shaped notches 6 disposed radially. In this way integral flaps 7 are formed on the sheath of the tread, and these flaps correspond to the spokes 8, there being preferably the same number of flaps as spokes. Each flap is provided at its outer end with a notch 9 which is adapted to engage the sides of the spokes, as indicated at the right in Fig. 2. By reason of the presence of these notches 9, projecting ears 10 are formed on each side of each spoke, and these ears are provided with eyelets 11 to receive a thong, strap, or flexible band 12. The manner of applying this strap is illustrated very clearly in Figs. 2 and 4.

Referring to Fig. 4, a loop 13 is formed through the pair of eyes on the forward or rear side of the spoke, and after forming this loop, the body of the strap is disposed in half loops 14 which pass around opposite sides of the spokes as indicated. The end of the strap then passes through the other pair of eyes which are adjacent to the spoke, and these ends of the strap are then connected by means of a buckle 15 with which each strap is provided. When this strap is tightened up it will be evident that it will draw the ears 10 closely together in such a way as to tighten the sheath on the tire, and at the same time it draws the notches 9 close up against the sides of the spokes. By attaching the straps in this way a large or main loop 16 is formed around each spoke, and this loop has small extension loops 17 which connect the ears 10. From this arrangement it will be evident that if there is any tendency of the sheath to slip longitudinally on the tire in either direction, it will tend to tighten the small loop connecting the ears from which the spoke tends to move. Furthermore, the fact that the notches 9 receive the spokes, tends to prevent the tread from shifting either sidewise or lengthwise.

The outer face of the sheath is provided with a facing strip or tread proper 18. This strip covers only a short portion of the outer side of the sheath and extends continuously around the tire, with the sheath; it is provided at intervals with studs 19 which are adapted to grip the ground in a well known manner so as to prevent skidding. The presence of the V-shaped notches 6 enables the sheath to fit very closely to the tire and wheel. If these notches are not present the sheath tends to pucker at its inner portion on account of the fact that the diameter at this point is less than at the outer portion of the sheath. The notches are arranged so that their edges rest against the sides of the spokes and this arrangement has a tendency to prevent the sheath from working longitudinally along the tire.

Having thus described my invention, I claim as new and desire to secure by Letters Patent,—

A tire having a sheath encircling the tire and substantially covering the outer portion thereof, said sheath having oppositely placed eyes before the spokes of the wheels, and oppositely placed eyes behind the spokes of the wheels, and a flexible band forming loops connecting said pairs of eyes and forming a loop around the spokes.

In testimony whereof I have signed my name to this specification in the presence of two subscribing witnesses.

DENIS T. O'SULLIVAN.

Witnesses:
E. D. JUNIOR,
C. W. BOSTWICK.